(12) United States Patent
Beck

(10) Patent No.: US 12,504,759 B2
(45) Date of Patent: Dec. 23, 2025

(54) DISTRIBUTION SYSTEM

(71) Applicant: Roche Diagnostics Operations, Inc., Indianapolis, IN (US)

(72) Inventor: David Beck, Freiberg a.N. (DE)

(73) Assignee: Roche Diagnostics Operations, Inc., Indianapolis, IN (US)

( * ) Notice: Subject to any disclaimer, the term of this patent is extended or adjusted under 35 U.S.C. 154(b) by 308 days.

(21) Appl. No.: 18/124,805

(22) Filed: Mar. 22, 2023

(65) Prior Publication Data

US 2023/0221727 A1 Jul. 13, 2023

Related U.S. Application Data

(63) Continuation of application No. PCT/EP2021/075899, filed on Sep. 21, 2021.

(30) Foreign Application Priority Data

Sep. 22, 2020 (EP) .................................... 20197547

(51) Int. Cl.
*G05D 1/00* (2024.01)
*G05B 19/418* (2006.01)

(52) U.S. Cl.
CPC ..... *G05D 1/0214* (2013.01); *G05B 19/41815* (2013.01); *G05B 19/41895* (2013.01); *G05D 1/0259* (2013.01)

(58) Field of Classification Search
CPC ............... G05D 1/0214; G05D 1/0259; G05B 19/41815; G05B 19/41895; G01N 35/04; G01N 2035/0477; G06Q 10/08355
See application file for complete search history.

(56) References Cited

U.S. PATENT DOCUMENTS

2019/0152057 A1 5/2019 Sharp et al.
2020/0363819 A1* 11/2020 Stadie .................. B65G 1/0464

FOREIGN PATENT DOCUMENTS

EP 3385893 A1 10/2018
EP 3537159 A1 9/2019
(Continued)

OTHER PUBLICATIONS

Sarma, Sayan Sen, et al. "Distributed algorithm for traffic dissemination in Manhattan networks with optimal routing-time." Proceedings of the Symposium on Applied Computing. 2017. (Year: 2017).*
(Continued)

*Primary Examiner* — Russell Frejd
*Assistant Examiner* — Ana D Thomas
(74) *Attorney, Agent, or Firm* — Taft Stettinius & Hollister LLP

(57) ABSTRACT

There is described a method of operating a distribution system. The distribution system comprises a number of carriers wherein the carriers are adapted to carry one or more goods. A transport plane of the distribution system supports the carriers. A control device controls the drive means. During an initialization of the distribution system the control device pre-defines a pattern of safe points on the transport plane, wherein on the safe points a carrier can be placed. After the initialization of the distribution system the control device calculates partial routes for the carriers so that the end position of each partial route is either one of the safe points or has a free path to one of the safe points to be reachable in the next partial route.

19 Claims, 5 Drawing Sheets

(56) References Cited

FOREIGN PATENT DOCUMENTS

Figure 1:
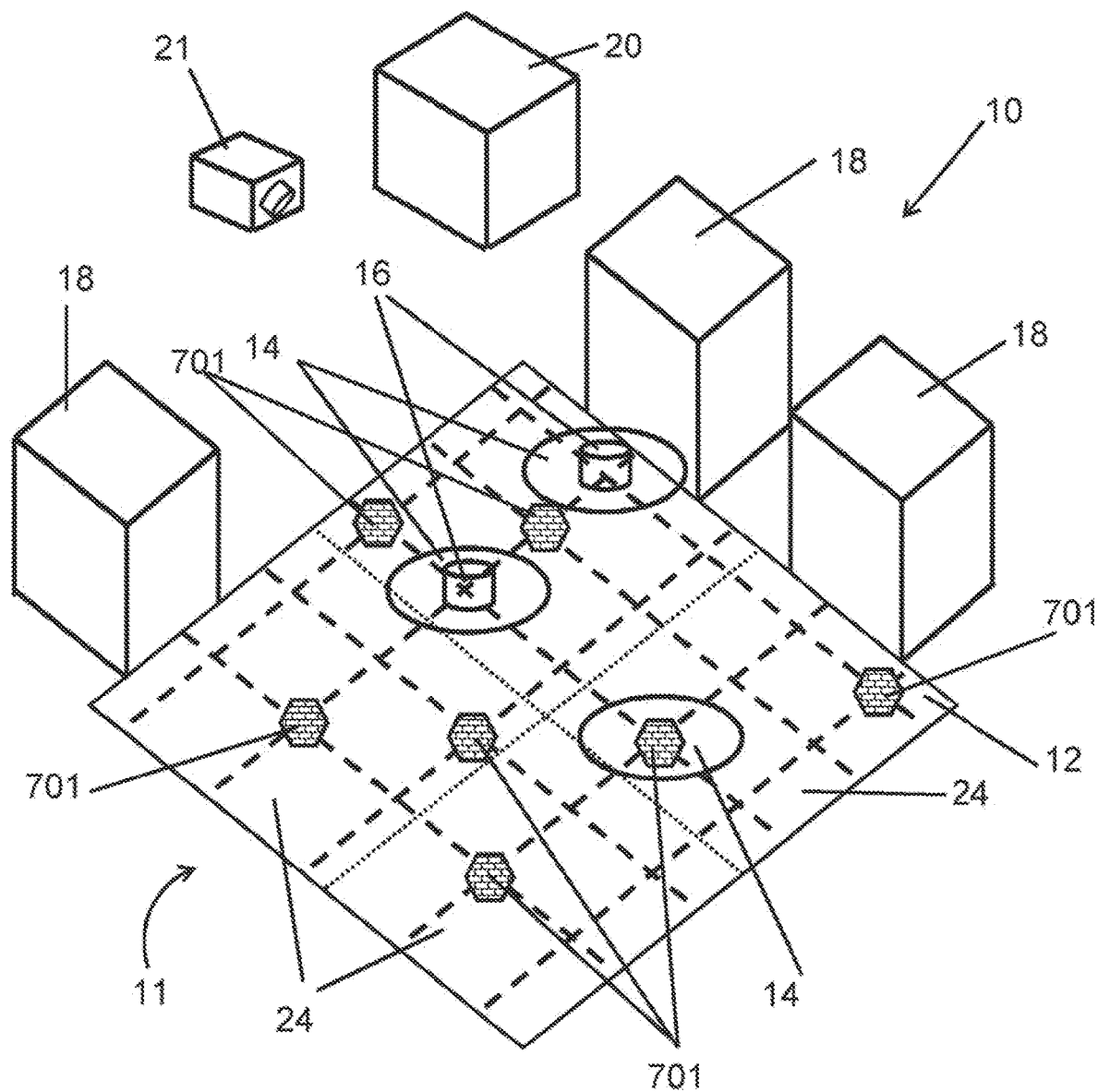

WO      2012158520 A1    11/2012
WO      2013064656 A1     5/2013

OTHER PUBLICATIONS

Solomon, Fredric J., Collette S. Dechard, and Robert Donnenberg. "The design, development, and implementation of a fully automated compound distribution center." JALA: Journal of the Association for Laboratory Automation 11.3 (2006): 138-144. (Year: 2006).*
International Search Report; European Patent Office; International Application No. PCT/EP2021/075899; Oct. 18, 2021; 4 pages.
Written Opinion of the International Searching Authority; European Patent Office; International Application No. PCT/EP2021/075899; Oct. 18, 2021; 8 pages.
Tao, Ma et al.; Optimal route re-planning for mobile robots: a massively parallel incremental A* algorithm; Proceedings of International Conference on Robotics and Automation; 1997; pp. 2727-2732.
Zhu, Weiping et al.; Waypoint Graph Based Fast Pathfinding in Dynamic Environment; 2015; pp. 5-19; Retrieved from the Internet: URL:https://journals.sagepub.com/doi/10.1155/2015/238727.
International Preliminary Report on Patentability, The International Bureau of WIPO, International Patent Application No. PCT/EP2021/075899, Jan. 9, 2023, 7 pages.

* cited by examiner

DISTRIBUTION SYSTEM

CROSS-REFERENCE TO RELATED APPLICATIONS

This application is a continuation of International PCT Application No. PCT/EP2021/075899 filed on Sep. 21, 2021, which claims priority to European Patent Application No. 20197547.1 filed on Sep. 22, 2020, the contents of each application are incorporated herein by reference in their entireties.

TECHNICAL FIELD

Embodiments of the invention refer to a method for distribution system, a distribution system and in particular a routing method to calculate routes for carriers moving on a transport plane.

RELATED ART

WO2012158520 discloses a laboratory product transport element for a laboratory transport system with an energy receiver and/or energy accumulator to provide drive power. The laboratory product transport element comprises at least one signal receiver to receive control signals, a control unit to generate drive signals as a function of at least one control signal obtained from the at least one signal receiver, movement devices for independent movement of the laboratory product transport element on a transfer path as a function of the drive signals of the control unit, in which the drive devices are driven by the drive power and at least one holder to hold a laboratory product being transported. Furthermore, a transfer path arrangement is described.

WO2013064656 describes a laboratory sample distribution system comprising: a number of container carriers, said container carriers each comprising at least one magnetically active device, preferably at least one permanent magnet, and being adapted to carry a sample container containing a sample. A transport device comprises a transport plane being adapted to carry said multiple container carriers and a number of electromagnetic actuators being stationary arranged below said transport plane. Said electro-magnetic actuators being adapted to move a container carrier placed on top of said transport plane by applying a magnetic force to said container carrier. A control device is adapted to control the movement of said container carriers on top of said transport plane by driving said electro-magnetic actuators, wherein said control device is adapted to control the movement such that more than two container carriers are movable simultaneously and independently from one another.

EP3385893 discloses systems, methods, and machine-executable coded instruction sets for controlling the movement of transporting devices and/or operations conducted at various workstations. In particular, the disclosure provides methods, systems and computer-readable media for controlling the movement of transporting devices configured for fully—and/or partly automated handling of goods and/or controlling operations conducted at various workstations.

"Ma Tao, A. Elssamadisy, N. Flann and B. Abbott, "Optimal route re-planning for mobile robots: a massively parallel incremental A* algorithm," Proceedings of International Conference on Robotics and Automation. Albuquerque, NM, USA, 1997. pp. 2727-2732 vol 3, doi: 10.1109/RO-BOT.1997.619372." discloses the principal advantage of incremental A* algorithms for precomputing and maintaining routes for mobile robotic vehicles, which is the completeness and optimality of the approach. However, the computational burden becomes unreasonable when large worlds are modeled or fine resolution is required, since the complexity is bound by the area modeled. This problem is compounded when multiple vehicles and multiple goals are involved, since routes to each goal from each vehicle must be maintained. A massively parallel incremental A* algorithm is disclosed which is suitable for implementing in VLSI. The number of iterations of the parallel algorithm is bound by the optimal path length, providing a significant speedup for large worlds. Empirical studies combined with a feasible VLSI design estimate that path calculations on a 1000 by 1000 world could be done in approximately 110 mS worse case.

EP 3 537 159 A1 describes a method of operating a laboratory sample distribution system, wherein the laboratory sample distribution system comprises: —a plurality of sample container carriers, wherein the sample container carriers are adapted to carry a laboratory sample container, —a transport plane, wherein the transport plane is adapted to support the sample container carriers, and—a plurality of drive elements, wherein the drive elements are adapted to move the sample container carriers on the transport plane, wherein the method comprises the steps: —a) planning a movement path for one of the sample container carriers from a start to a goal on the transport plane, wherein the transport plane is logically modelled by a plurality of nodes, wherein the nodes are free for at least one time-window or reserved for at least one-time window, wherein the planning comprises analyzing the reachability out of a free time-window of one of the nodes to free time-windows of at least one next node and at least one at least over-next node, such that a planned movement of the one sample container carrier is nonstop from the one node over the next node to the at least one over-next node, and reserving the planned movement path comprising a sequence of time-windows of nodes, and—b) executing by controlling at least one of the drive elements, such that the one sample container carrier moves along the reserved movement path on the transport plane.

US 2014/152057 A1 describes a robotic load handler coordination system which includes a robotic load handler configured for traversing, when in use, a plurality of cells arranged in a grid formation. The load handler is arranged to receive an instruction associated with execution of a selected determined route from a starting cell to a destination cell. A processing resource is arranged to support a movement optimiser, the movement optimiser being arranged to determine a plurality of routes iteratively using an A* pathfinding algorithm in order to determine a number of sets of routes respectively from a number of the plurality of cells to the destination cell. The number of the plurality of cells includes the starting cell, and the movement optimizer is arranged to select an optimum route to the destination cell from the set of routes in respect of the starting cell.

SUMMARY

An object of the invention is to realize a reliable method of operating a distribution system. This is realized by the method according to claim 1.

A first aspect of the present invention concerns a method of operating a distribution system, wherein the distribution system comprises a number of carriers wherein the carriers are adapted to carry one or more goods. A transport plane is adapted to support the carriers. Drive means are adapted to move the carriers on the transport plane, and a control device controls the drive means.

The Method Comprises the Steps:

during an initialization of the distribution system the control device pre-defines a pattern of safe points on the transport plane, wherein on the safe points a carrier can be placed and after the initialization of the distribution system the control device calculates partial routes for the carriers so that the end position of each partial route is either one of the safe points or has a free path to one of the safe points to be reachable in the next partial route.

This avoids or minimizes the occurrences of dead locks meaning the blocking of carriers on the transport plane. A safe point is a position on the transport plane on which a carrier can be placed and be moved away again. So the safe point has at least one neighboring position on the transport plane which is not a safe point, so that a carrier on the safe point can be removed from the safe point even if all safe points in the neighborhood of this safe point are occupied with other carriers.

This placement on a safe point or reachability of a safe points guarantees that in case of a traffic jam of the carries on the transport plane, the carriers will be placed onto safe points, still allowing a free path.

In general a route of a carrier on the transport plane form a start position to a final destination position is divided into one or more partial routes to intermediate destinations.

The transport plane comprises a plurality of logical positions. The term "logical position" is abroad term and is to be given its ordinary and customary meaning to a person of ordinary skill in the art and is not to be limited to a special or customized meaning. The term specifically may refer, without limitation, to an arbitrary location of the transport plane being adapted to support a carrier. A presentation of the transport plane may be a graph with logical positions or logical positions and allowed connections between them. The transport plane may be mathematically mapped to a graph of logical positions or a graph of logical positions and allowed connections between them. Routing, for example finding of routes, of the carriers on the logical positions may be performed using the graph. The safe points may be defined out of these logical positions. Logical positions may be defined on the transport plane by hardware requirements and/or by software. Each of the logical positions may be configured for being occupied by only one carrier. Thus, two carriers cannot share one logical position. The distribution system may be configured for moving a plurality of carriers on the transport plane via respective calculated partial routes, wherein the respective route may lead from a first logical position to a second logical position, i.e. the end position of the respective partial route. However, in case of unlimited access for partial route of each carrier to each of the logical position, the plurality of carriers on the transport plane may cause traffic jam. In worst case, the carrier may interfere with or block each other's movement such that the routes cannot be fulfilled. Therefore, the present invention proposes boundary conditions and/or constrains for the end position of partial routes of the carriers, in particular that the end position of each partial route is either one of the safe points or has a free path to one of the safe points to be reachable in the next partial route. Thus, the other logical positions not pre-defined as safe-points, may not be considered as end position for partial routes at all or may be considered only if the carrier has free path to one of the safe points to be reachable in the next partial route by the control device for calculating the partial routes. This boundary condition and/or constrain for calculating the partial routes may guarantee that in case of a traffic jam of the carriers on the transport plane, the carriers will be placed onto safe points, still allowing movement of the carriers for fulfilling the calculated respective partial routes. Thus, in case of traffic jams, the traffic jams will leave a free path from each of the safe points. There are still traffic jams but these jams will leave a free path from each of the safe points. The occupied safe points in the "jam" will present the pattern of safe points on the transport surface. If the traffic decreases, the jam can be resolved without carriers blocking each others. Blocking will result in endless computing loops. According to the present invention, in case of traffic jam, only safe points are allowed. So if ahead all safe points are occupied the carrier cannot move because no safe point can be reached or can be a reached in the next move.

As outlined above, during initialization of the distribution system logical positions may be pre-defined by the control device into the pattern of safe points and other logical positions. The other logical position may be defined as aisle and/or empty space around a safe point. The control device may be configured for selecting the pattern of safe points out of the entirety of logical positions. The term "safe point" is a broad term and is to be given its ordinary and customary meaning to a person of ordinary skill in the art and is not to be limited to a special or customized meaning. The term specifically may refer, without limitation, to a logical position selected in view of a range of motion for a carrier occupying said logical position. The range of motion may be that a carrier can be placed on the safe point and can be moved away again, in particular in the next partial route. While a safe point and the path to the safe point may be reserved for a carrier, other carriers still can drive over said safe point. But these carriers may not be allowed to stop at said safe point. The pattern of safe points may be selected such that even in case all of the safe points of the pattern are occupied by carriers moving of the carriers from the safe points is possible. The pattern of safe points may be selected such that each of the safe points has at least one neighboring position on the transport plane which is not a safe point. For example, the pattern of safe points may be selected such that each of the safe points has at least two neighboring positions on the transport plane which are not safe points. For example, the pattern of safe points may be selected that the safe points are not neighboring logical positions on the transport plane. For example, the pattern of safe points may be selected that the safe points are separated by at least one logical position not being a safe point. Thus, a carrier on the safe point can be removed from the safe point even if all safe points in the neighborhood of this safe point are occupied with other carriers. The control device may be configured for calculating partial routes with the boundary condition that all carriers can only stop onto safe points and not in the aisles and/or empty spaces or having at least free path to a safe point in the next partial route. The control device may be configured for calculating partial routes with the boundary condition that all carriers are on a safe point for every move before the carrier may start to move. The control device may be configured for calculating partial routes with the boundary condition that safe points are defined for every partial path and must be reachable, so that in situations of high traffic, only safe points may be occupied.

Various patterns of safe points may be possible. For example, the pattern of safe points may be direction dependent, e.g. for a specific travel direction. The advantage of having direction dependent safe points may be that two carriers placed on two neighboring safe positions will not have opposite directions. One of both carriers would have to move around the other to a continue movement. The pattern may comprise a plurality of clusters of safe points. A movement passage following a preferred direction of movement may be arranged around each cluster of safe points. The transport plane may comprise a plurality of transport modules. A constant number of safe points may be used for each transport module. The direction of movement of the carrier towards a next inner corner may determine which safe points may be used in a transport module.

In a further embodiment of the method the control device calculates partial routes so that the carrier stops on a safe point if the traffic on the transport plane exceeds a predefined density, e.g. 50% of the transport plane is covered with carriers or in case of a traffic jam, i.e. no free safe point ahead on the routed way.

A further aspect of the method of operating a distribution system is that in the initialization of the distribution system, handover positions are defined on the transport plane to hand over the goods and wherein the safe points are predefined so that between the handover positions exist a free path alongside the safe points.

Another aspect of the method of operating a distribution system is that the control device defines during the initialization of the distribution system moving directions as straight lines on the transport plane in particular in at least two directions which in particular are perpendicular to each other wherein the calculated routes uses these moving directions.

This reduces the degree of freedom to calculate the routes so that the calculation becomes faster. In particular, the carriers move only on straight lines and stops if they change directions in particular the carriers only change direction in an angle resolution of 90 degree.

A further aspect of the disclosed method of operating a distribution is that logical positions are defined on the transport plane, wherein the safe points are logical positions.

Logical positions are defined on the transport plane either by hardware requirements or by software only. The former is the case, e.g. for transport systems with electromagnetic coils underneath the transport plane to push and or pull carriers with active magnetic devices. So positions, where the carriers can be well defined placed above a electromagnetic coil. The latter is the case with self-driving carriers on any transport plane. e.g. a floor in a workshop area. In this case, the logical positions can be defined by software on specific positions on the transport plane.

In a further embodiment for each logical position the control device calculates during initialization of the distribution system partial routes for each logical position to a next safe point in particular reachable within moving over n logical positions, which are stored in a look up table. N is an integer in the range of 3 to 60 in particular in the range of 12 to 30 more in particular 24.

Another aspect of the method of operating a distribution system is that the transport plane consists of tile elements connected to each other, wherein during the initialization of the distribution system the control system maps a layout of the transport plane by identifying the boundaries by creating a vector for each edge of the tile elements, cancel out all vectors based on their neighbors of neighboring tile elements, and combine remaining vectors which are adjacent and have the same direction. Therefore, an easy and reliable boundary mapping of the transport plane is possible and can be easily repeated if the tile geometry changes.

An additional aspect of the method of operating a distribution system is that during the mapping of the distribution system inner corners are identified by identifying a change in direction of adjacent remaining vectors and calculating their vector product and mapping inner corners or outer corners to negative or positive vector products respectively depending on the initial direction of the vectors. This allows for reliable detection of inner corners.

In the plane of the transport plane logical positions can be characterized by the number of neighboring logical positions inner logical positions may have four neighboring and/or adjacent logical positions allowing movement in four directions. The term "corner" is a broad term and is to be given its ordinary and customary meaning to a person of ordinary skill in the art and is not to be limited to a special or customized meaning. The term specifically may refer, without limitation, to a logical position failing to have a neighboring and/or adjacent logical position in at least one direction of movement. The term "inner corner" is a broad term and is to be given its ordinary and customary meaning to a person of ordinary skill in the art and is not to be limited to a special or customized meaning. The term specifically may refer, without limitation, to a logical position failing to have a neighboring and/or adjacent logical position in one direction of movement. The inner corner may have three neighboring and/or adjacent logical positions. The term "outer corner" is a broad term and is to be given its ordinary and customary meaning to a person of ordinary skill in the art and is not to be limited to a special or customized meaning. The term specifically may refer, without limitation, to a logical position failing to have a neighboring and/or adjacent logical position in two directions of movement. The outer corner may have two neighboring and/or adjacent logical positions.

A further aspect of the method of operating a distribution system is that neighboring inner a corners are determined during initialization.

Two inner corners are neighbors if the rectangle spanned by the corners is located totally on the transport plane, or in other words, the rectangle does not include apportion out of the transport plane.

Another aspect of the method of operating a distribution system is that the routes are calculated so that the carriers maintain the distance to the inner corner while passing the inner corner. This means that the carriers do not move on the shortest path around a corner but this will enhance overall throughput of the distribution method and avoid conflicts between carriers and hence possible dead locks wherein carriers block each other. A corner, such as inner or outer corner, may be a potential bottleneck for movement of the carriers since at the corner the carriers have limited the range of movement in at least one direction. Thus, detection of inner and outer corners may be advantageous for preventing traffic jam. The present invention proposes identifying corners and considering corners for calculating partial routes. For example, the routes of the carriers may be calculated so that the carriers maintain the distance to the inner corner while passing the inner corner. The control device may be configured for calculating partial routes considering that the carriers do not move as close to the inner corner as possible. The control device may be configured for calculating partial routes considering that a waypoint prior to a direction change takes into account the distance between starting position to an outer boundary of the transport plane, also denoted as system boundary, closest to the inner corner. The inner corner may be formed by two outer boundaries of the transport plane. In the start position a carrier may face one of the outer boundaries and has a first distance to said outer boundary. The control device may be configured for calculating the partial route for said carrier around the inner corner considering that during movement of said carrier the first distance is preserved. The control device may be configured for calculating of the partial route for said carrier around the inner corner considering only logical positions having a distance corresponding to the first distance from the outer boundaries forming said inner corner. In case of multiple carriers, this may allow ensuring that the multiple carriers are evenly spaced around an inner corner before changing the movement direction and avoiding traffic jam at the inner corner.

An additional aspect of the method of operating a distribution system is that during initialization the Manhattan distance between neighboring inner corners is determined. The Manhattan distance is a distance between two points measured along axes at right angles. For example, in a plane with point A at $(x_1, y_1)$ and point B at $(x_2, y2)$, the Manhattan distance may be $|x_1-x_2|+|y_1-y_2|$.

A further aspect of the method of operating a distribution system is that during initialization a node network is generated indicating the path and Manhattan distance between at least two, in particular all, neighboring inner corners.

In a further embodiment of the method, during initialization, a lookup table is created that takes two inner corners as input parameters and outputs the path between the input inner corners as a list of intermediate inner corners and in addition the Manhattan distance along the path.

This allows for fast and reliable route calculation if two routes have the same distance, the one with less intermediate nodes is favored.

Another aspect of the method of operating a distribution system is that the partial route of a carrier is determined by the Manhattan distance between its current position and its destination position to a next intermediate destination position using:
1. follow a straight line, if not possible then follow an L shaped path, if not possible then
3. determine the next intermediate destination position using an A*-algorithm if not possible then
4. if the carrier stays on current position less then n seconds then wait for change in neighborhood
    a. If change happened restart with 1.
    b. If carrier waited longer than n seconds then
    c. search for the next safe point and use the A* algorithm to reach this safe point, and if not possible
    d. wait for change in neighborhood and if change happened restart with 1.

wherein n is number between 1 and 10 in particular 3.

This allows for a reliable and easy routing of the carriers.

The destination position may be the position where the carrier has to go finally to fulfill its task. An intermediate position may be a position on the carrier's way to the destination position. For the intermediate position the restrictions that it is either one of the safe points or that from the intermediate positions the carrier has a free path to one of the safe points to be reachable in the next partial route have to be fulfilled. The intermediate position may be an end point of the partial move.

A further aspect of the method of operating a distribution system is that the determined partial route is reserved for the carrier until the carriers reaches its intermediate or final destination. This means that no other carrier can use the reserved route or during the respective carrier is moving.

This allows that the method takes into account the routes and positions of other carriers to calculate the route for one carrier.

An additional aspect of the method of operating a distribution system is that for each carrier the next intermediate destination position is determined one after the other until the final destination position is reached. This means that the total route of a carrier is divided into smaller partial routes.

This allows to better take into account other carriers and to increase the flow of all carriers towards their final destinations.

A further aspect of the method of operating a distribution system is that a position determination system determines the position of the carriers on the transport plane and sends position update messages to the controller, which trigger the release of reserved logical fields which were already passed by the carrier on its current movement.

This allows for a faster release of reserved logical positions on the route or partial route and hence more efficient routing of all carriers which increase the overall throughput of the method.

Another aspect of the method of operating a distribution system is that a carrier never moves longer than in logical positions wherein m is an integer between 3 and 50, in particular between 10 and 30, more in particular is 24.

This allows for a higher overall throughput of the method.

However, other embodiments are feasible which relates to a combination of features disclosed herewith.

Summarizing and without excluding further possible embodiments, the following embodiments may be envisaged:

Embodiment 1. A method of operating a distribution system, wherein the distribution system comprises
   a number of carriers wherein the carriers are adapted to carry one or more goods,
   a transport plane wherein the transport plane is adapted to support the carriers,
   drive means, wherein the drive means are adapted to move the carriers on the transport plane,
   and a control device adapted to control the drive means, wherein the method comprises the steps:
   a during an initialization of the distribution system the control device pre-defines a pattern of safe points on the transport plane, wherein on the safe points a carrier can be placed and
   after the initialization of the distribution system the control device calculates partial routes for the carriers so that the end position of each partial route is either one of the safe points or has a free path to one of the safe points to be reachable in the next partial route.

Embodiment 2. A method of operating a distribution system according to the previous embodiment, wherein handover positions are defined on the transport plane to hand over the goods and wherein the safe points are predefined so that between the handover positions exist a free path alongside the safe points.

Embodiment 3. A method of operating a distribution system according to the previous embodiment wherein the control device defines during the initialization of the distribution system moving directions as straight lines on the transport plane in particular in at least two directions which in particular are perpendicular to each other wherein the calculated routes uses these moving directions.

Embodiment 4. A method of operating a distribution system according to one of the previous embodiments, wherein logical positions are defined on the transport plane, wherein the safe points are logical positions.

Embodiment 5. A method of operating a distribution system according to one of the previous embodiments, wherein the transport plane consists of tile elements connected to each other, wherein during the initialization of the distribution system the control system maps a layout of the transport plane by identifying the boundaries by creating a vector for each edge of the tile elements, cancel out all vectors based on their neighbors of neighboring tile elements, and combine remaining vectors which are adjacent and have the same direction.

Embodiment 6. A method of operating a distribution system according to the previous embodiment, wherein during the mapping of the distribution system inner corners are identified by identifying a change in direction of adjacent remaining vectors and calculating their vector product and mapping inner corners or outer corners to negative or positive vector products respectively depending on the initial direction of the vectors.

Embodiment 7. A method of operating a distribution system according to the previous embodiment, wherein during initialization neighboring inner corners are determined.

Embodiment 8. A method of operating a distribution system according to the previous embodiment, wherein the routes of the carriers are calculated so that the carriers maintain the distance to the inner corner while passing the inner corner.

Embodiment 9. A method of operating a distribution system according to the previous embodiment, wherein the Manhattan distance between neighboring inner corners is determined.

Embodiment 10. A method of operating a distribution system according to the previous embodiment, wherein a node network is generated indicating the path and Manhattan distance between at least two, in particular all, neighboring inner corners Embodiment 11. A method of operating a distribution system according to the previous embodiment wherein the partial route of a carrier is determined by the Manhattan distance between its current position and its destination position to a next intermediate destination position using:
 1. Follow a straight line, if not possible then Follow an L shaped path, if not possible then
 3. Determine the next intermediate destination position using an A*-algorithm if not possible then
 4. If carrier stays on current position less then n seconds then wait for change in neighborhood
  4.1. If change happened restart with 1.
 5. If carrier waited longer than n seconds then
  5.1. search for the next safe point and use the A* algorithm to reach this safe point, and if not possible
  5.2 wait for change in neighborhood and if change happened restart with 1.
wherein n is number between 1 and 10 in particular 3.

Embodiment 12. A method of operating a distribution system according to the previous embodiment, wherein the determined route is reserved for the carrier until the carriers reaches its intermediate or final destination.

Embodiment 13. A method of operating a distribution system according to the previous embodiment wherein for each carrier the next intermediate destination position is determined one after the other until the final destination position is reached.

Embodiment 14. A method of operating a distribution system according to one of the previous embodiments, wherein a position determination system determines the position of the carriers on the transport plane and sends position update messages to the controller, which trigger the release of reserved logical fields which were already passed by the carrier on its current movement.

Embodiment 15. A method of operating a distribution system according to one of the previous embodiments, wherein a carrier never moves longer than in logical positions wherein in is an integer between 3 and 50, in particular between 10 and 30, more in particular is 24.

SHORT DESCRIPTION OF THE FIGURES

Further optional features and embodiments of the invention will be disclosed in more detail in the subsequent description of preferred embodiments, preferably in conjunction with the dependent claims. Therein, the respective optional features may be realized in an isolated fashion as well as in any arbitrary feasible combination, as the skilled person will realize. The scope of the invention is not restricted by the preferred embodiments. The embodiments are schematically depicted in the Figures. Therein, identical reference numbers in these Figures refer to identical or functionally comparable elements.

Figure 2:
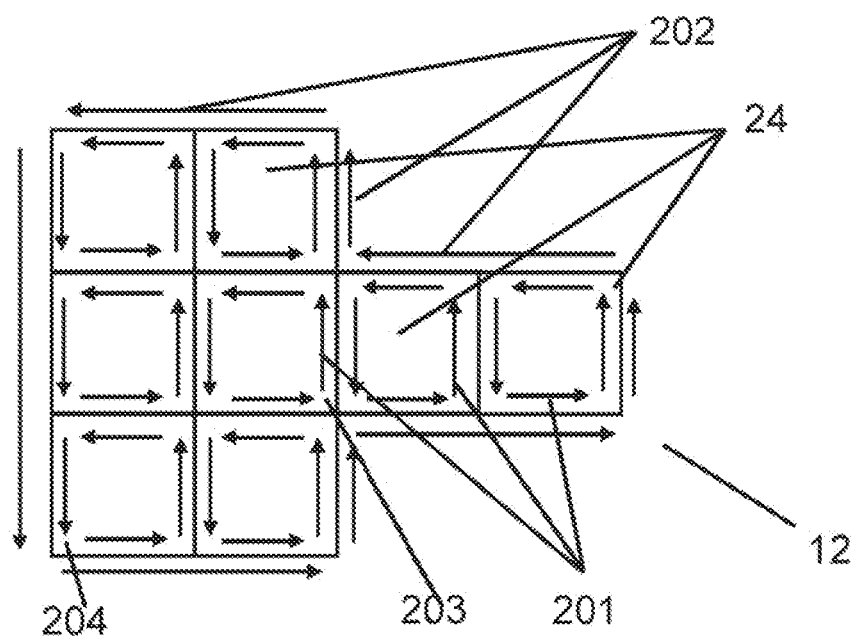
Figure 3:
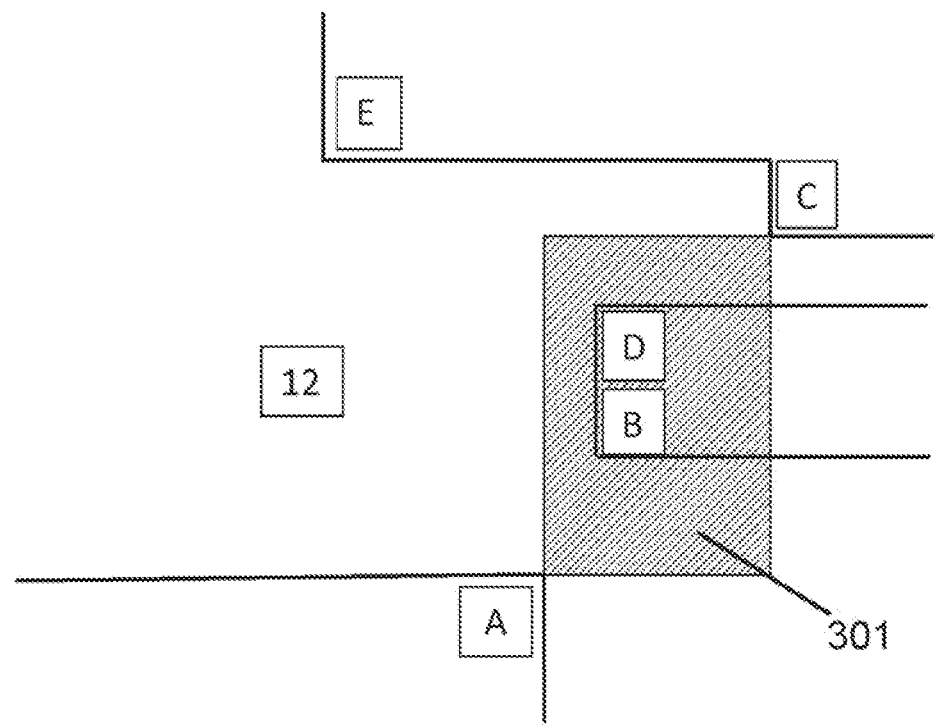
Figure 4:
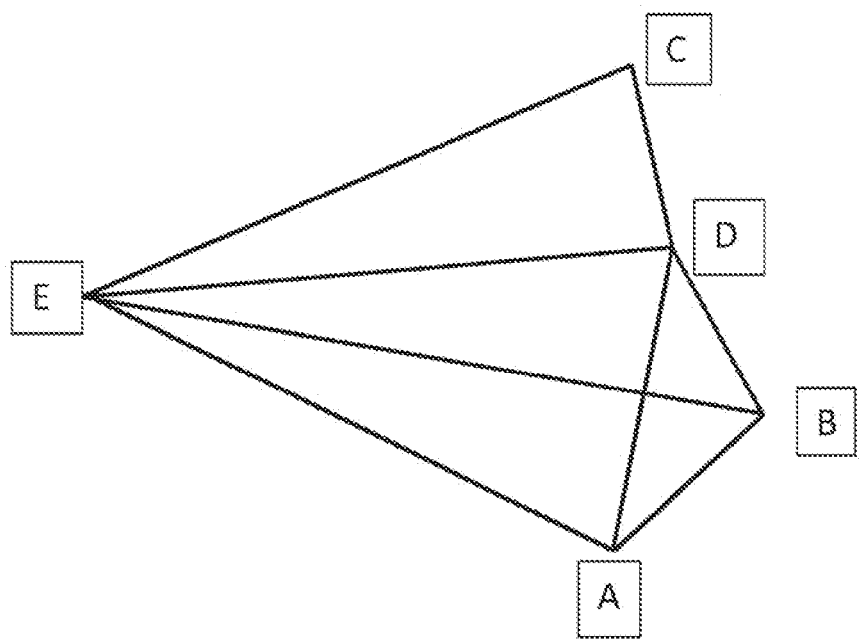
Figure 5:
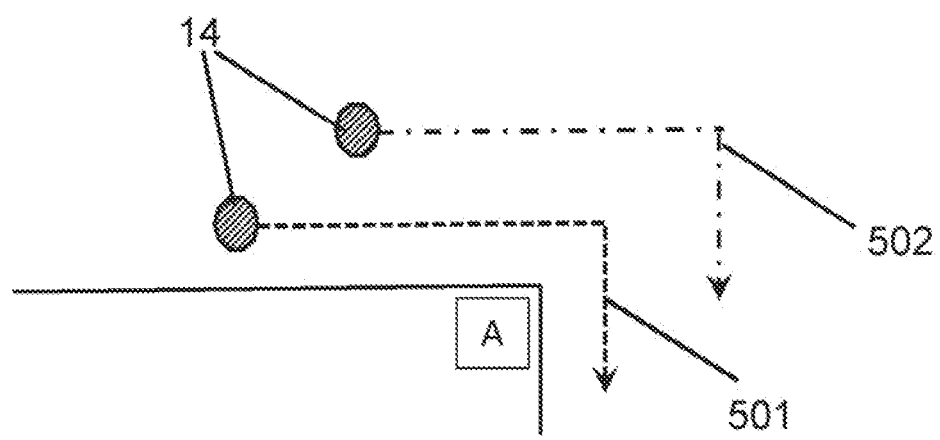
Figure 6:
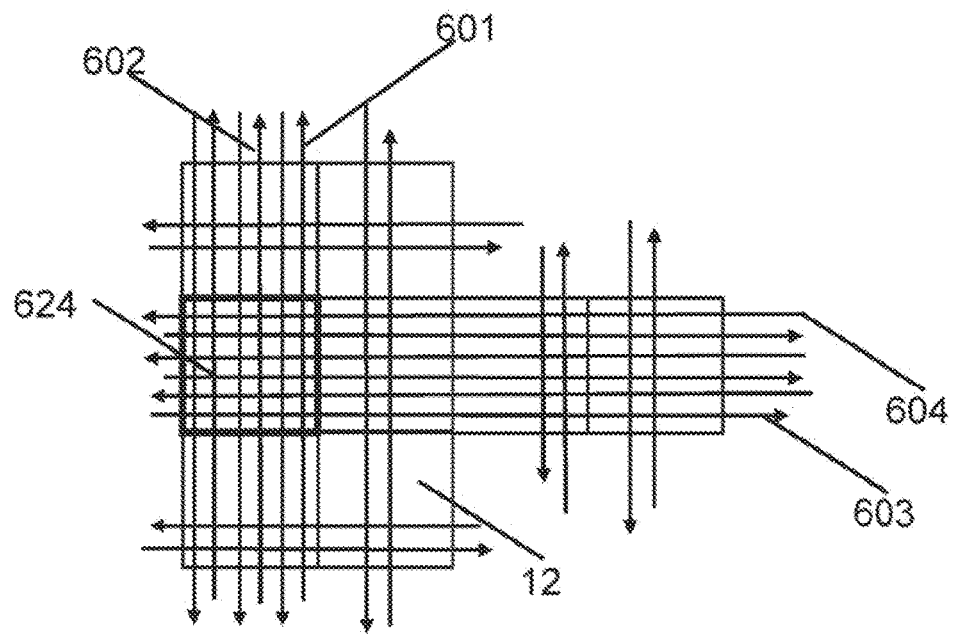
Figure 7:
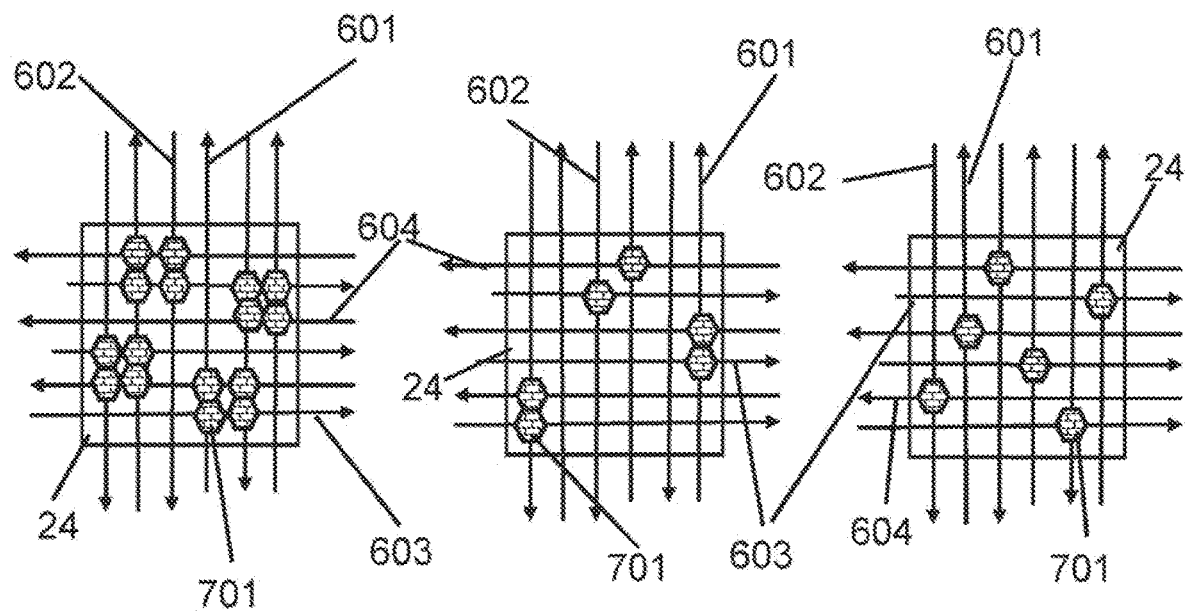
Figure 8:
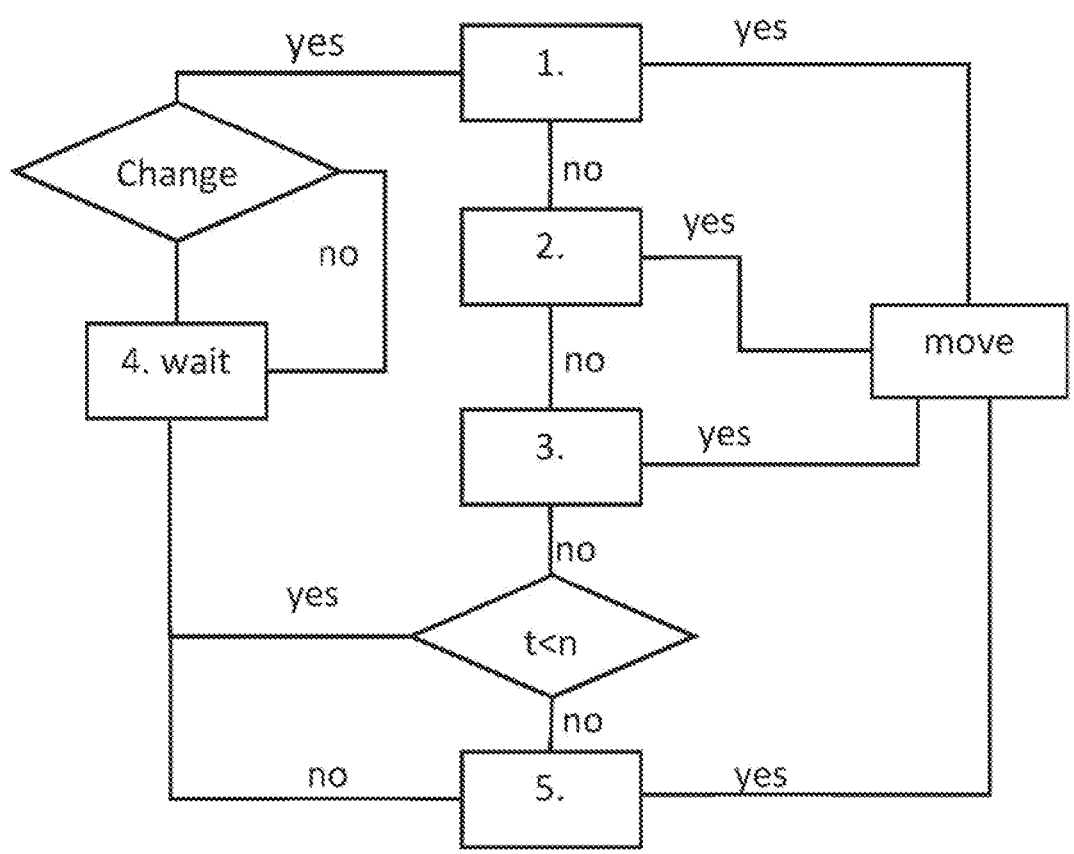

In the Figures:
 FIG. 1 is a perspective view of a distribution system;
 FIG. 2 shows a schematic of a possible layout of a transport plane and the determination of its boundaries;
 FIG. 3 shows a portion of a transport plane with its inner corners
 FIG. 4 show a path diagram of the inner corners shown in FIG. 3;
 FIG. 5 show schematically how carriers move around an inner corner;
 FIG. 6 shows partially the defined moving directions of the layout of transport plane shown in FIG. 2;
 FIG. 7 shows three possible patterns of safe points on a tile of the transport plane; and
 FIG. 8 shows of flow chart to determine a route of a carrier.

DETAILED DESCRIPTION OF THE EMBODIMENTS

FIG. 1 shows a perspective schematic of a distribution system 10, e.g. a transport system of a diagnostics laboratory to get test results in particular for patients.

The distribution systems 10 comprise in general 2 parts: First, a transport system 11 that executes the movements of carriers 14 according to given plans, computed by a router software. The transport system communicates to the software system all or pre-defined position changes of the carriers 14 and potential errors. Second, a software system that receives the status updates about the carrier's positions and errors and calculates a new plan for next movements, based on this status update and the new requests for transporting the carriers 14 to their destinations. These plans are sent to the transport system to be executed.

The distribution system 10 is required to transport objects 16, e.g. tubes with biological sample fluids and/or consumables between stations 18, e.g. analyzers, pre- or post-analytical stations, of the distribution system 10. In addition, other species like tissue, reagents, waste or disposables can be transported between the stations 18. The stations 18 can also be modules of a diagnostic laboratory, for instance an aliquot generating station, a centrifuge or an analyzing module performing one single analysis. In other embodiments a distribution system 10 can be a warehouse distribution system to distribute goods as objects 16 between stations 18 such as shelves and packing stations, or a manufacturing site where objects 16 are blanks or semi-finished products which need to be transported between working stations, e.g. at a machinery workshop. Furthermore, the transport plane can also be used inside the stations 18 to transport the carriers inside the stations 18 if needed.

The distribution system 10 comprises a transport plane 12 and carriers 14, which are moved or move themselves on or even hover over the transport plane 10. To move the carriers 14, the distribution system 10 comprises a drive system. A drive system can be realized by electro-magnetic coils underneath the transport plane and permanent magnets in the carriers 14. Magnetic fields generated by the coils can then push and or pull the permanent magnet in the carrier 14 and hence the carriers 14 slide on or hover over the transport plane 12. To localize the carriers 14 on the transport surface 12 sensors such as optical, magnetic or inductive sensors can be embedded in the transport surface 12. Other option can be a camera system with an image analyzing software to localize the carriers 14.

Other drive systems in other embodiments are also possible such as self-driving carriers 14 with sensors, motor and energy storage such as batteries in particular rechargeable batteries. So these self-driving carriers 14 can also drive autonomously over the transport plane 12. In this case the control device can also be part of the carriers or distributed over the carriers 14. Alternatively, robotic load handlers capable of traversing a plurality of cells arranged in a grid form are possible.

To control the movement of the carriers 14 a control system 20 is part of the distribution system. The control system 20 can e.g. control the drive currents of the coils or collect position information of the carriers 14. So the control system 20 is connected to the transport system 11 especially the drive system and the camera 21.

The dashed lines shown in FIG. 1 represent the graphs or possible movement paths between their intersections, which define logical positions. In this embodiment, the graphs form a rectangular mesh. However, other models are possible with curved movement paths for example. For some drive systems, the logical positions are given by technically possible start-stop position on the transport plane 12. This is the case e.g. for the drive system with coils under the transport plane 12. For self-driving carriers on the other hand purely software defined logical positions are possible, because the carriers can start and stop everywhere on the transport plane 12. At least the logical positions need a distance on the transport plane 12, so that two carriers 14 can be placed next to each other. The carriers 14 move along the logical positions on the transport plane.

The carriers 14 transport the objects 16 between the stations 18 on the transport plane 21. Either the objects are handed over to the stations 18 or the carrier moves into the station 18 with a similar transport system in the station 18. The position before the stations 18 on the transport system can be defined as final destination for a carrier if the object 16 on the carrier 14 has to be moved to the respective station 18.

For example in one embodiment as a diagnostic laboratory at one final destination positions tubes with biological fluids are place into carriers form a pre-analytical system. Further final destination positions can be at station 18 such as an analyzer where either the tube is gripped and placed in the analyzer or a part of the fluid can be pipetted at the final destination position.

For stations 18 with equal or similar transport systems in the station 18 itself the final destination position can be a logical position on the transport plane 12 where the carrier 14 can move into the station.

The transport plane 12 can be realized out of tile like transport modules 24.

A routing software module is realized in the control system 20 or can be alternatively be realized in any other not shown computing device connected to the control system 20. The routing software module implements the distribution method of the distribution system 10, by calculating partial routes of the carriers 14 along the logical positions towards their final destination or stations 18 they need to go.

In the embodiment shown in FIG. 1 the routing software module or control device defines during initialization a pattern of safe points 701. After the initialization of the distribution system 10 the control device 20 calculates partial routes for the carriers 14 so that the end position of each partial route is either one of the safe points 701 or has a free path to one of the safe points 701 to be reachable in the next partial route. The end positions and safe points are logical positions on the transport plane 12.

FIG. 2 shows an example for a specific embodiment for a layout mapping during the initialization to identify the layout boundaries and inner corners.

A layout of the transport plane 12 built out of transport modules 24 can be given to the software module by an "config" file from a software layer with higher hierarchy. In the initialization phase the software module creates four vectors 201 for each transport module 24 in a counter clockwise circulation around the boundaries of each transport module 24. In a next step each vector is added to the vector of a neighboring boundary of the transport module 24 next to this boundary. This cancels out all vectors based on their neighbors besides the vectors with the overall boundary of the transport surface 12. All vectors that do not cancel and follow the same direction are combined to build the border vectors 202.

The corners of the layout are identified where there is a direction change. The corners are grouped in inner and outer corners. The vector product between neighboring boundary vectors is calculated by the software module. For instance, with the chosen counter clockwise rotation of the vectors 201 the vector product of the boundary vectors 202 at inner corner 203 is negative and at the outer corner 204 positive.

Any changes in layout of the transport plane 12 that occur due to hardware signal changes indicating defects leads to a new layout initialization and the software module will recalculate routes that are affected by the layout changes.

FIG. 3 shows a portion of another embodiment with a transport plane 12 with inner corners A, B, C, D, and E. After the inner corners A, B, C, D, E where identified as explained above, neighboring inner corners are defined. Two inner corners are neighboring if the rectangle spanned between them lays completely on the transport plane 12. For instance, the rectangle 301 spanned between inner corners A and C lays in the open space between inner corners B and D and hence inner corners A and C are not neighboring inner corners.

In a next step the software module determines the true heuristic distances between the neighboring inner corners, for instance the Manhattan distance.

FIG. 4 shows the node network between the inner corners of the inner corners shown in FIG. 3. The node network is generated by the software module indicating the path and Manhattan distance between all inner corners.

Finally the software module generates and stores a table using the node network connecting all nodes with each other, listing the shortest distance between nodes. If there are multiple paths with the same total distance connecting two nodes, the path with the least number of intermediate nodes is favored. A node network and node distance table from the layout fraction of FIG. 3 is shown in the following table 1

TABLE 1

|   | A | B | C | D | E |
|---|---|---|---|---|---|
| A | 0 | 5/AB | 13/ADC | 8/AD | 16/AE |
| B | 5/BA | 0 | 8/BAC | 3/BD | 17/BE |
| C | 13/CDA | 8/CDB | 0 | 5/CD | 13/DE |
| D | 8/DA | 3/DB | 5/DC | 0 | 13 DE |
| E | 16/EA | 17/EB | 13/EC | 13/ED | 0 |

For instance, the Manhattan Distance between inner corner A and B is S. Arbitrary distance units can be used or for example also the number of logical positions the carrier have to move along can be used. Since the inner corners A and C are not neighboring inner corners, the Manhattan distance of the inner corners A, D and C is used.

The software module uses the node network based on inner corners as a rough plan/direction on how to reach individual logical positions in the transport plane, e.g. the final destination of a carrier 14. Further the table is used to determine true distance heuristics. This allows to speed up calculations and avoid unnecessary calculations during the routing, i.e. calculating the routes/moves of the carriers 14 on the transport plane 12.

In case of any hardware failures or redesigning within the transport plane 12, the layout initialization and determination of heuristic distances will be redone. Single logical position failures may be treated as an obstacle, so the logical position can be blocked and does not require re-initialization.

Once initialization is complete, routing of individual carriers 14 on the transport plane 12 is possible. Routing decisions occur based on initial position of the carrier 14 and its final destination. The software module determine routes individually for each carrier, one after the other.

Routes for the carriers 14 are determined on the basis of shortest distances on available, i.e. not reserved, portions of the transport plane 12, in particular on free, non reserved logical positions.

Upon identifying the initial position of the carrier 14 on the transport plane 12, along with its final destination, the shortest path between all combinations of initial neighboring node and destination neighboring node of the node network as shown in FIG. 4 is determined using a respective table such as table 1. The calculated route minimizes the true heuristic distance from the carrier's 14 initial position on the transport plane 12 to its final destination on the transport plane 12.

In an embodiment of the method, the software module defines partial routes of the calculated route by reserving a portion of the transport plane, in particular the respective logical positions along which the carrier 14 will move. Once a partial route is defined, the carrier 14 starts to move, without having to wait for the route determination of other carriers. The partial route is calculated so that the intermediate destination has a lower distance to the final destination than the current position.

Carrier's 14 position update messages are sent by a firmware of the transport system 11 or drive system during the carrier's 14 movement, which trigger the release of reserved portions of the transport plane 12 in particular of the logical fields that have already been driven on during the carrier's 14 movement.

As shown in FIG. 5, carriers 14 do not move as close to the inner corner A as possible, but their way point prior to a direction change takes into account the distance between starting position to the system boundary closest to the inner corner A. The carrier 14 nearer to the border moves along dooted arrow line 501. The carriers 14 farer from the border moves along dashed dotted line 502. Both keep the distance to the inner corner A. This is done so that multiple carriers 14 are evenly spaced around an inner corner before changing the movement direction. This will result in a higher overall throughput of the distribution method.

In one embodiment the route is composed of either straight or L-shape movements, with a maximum move length of 24 logical positions.

In a further embodiment of the distribution method the movement of the carriers is monitored in real time by sensors such as the camera 21 shown in FIG. 1 or by a sensor system in the transport plane 12 as described above. In another embodiment the respective signals are sent to the control device 20 in one, several or each of the cases of
 every time the carriers 14 crosses from one transport module 24 to another,
 every time a carrier 14 changes movement direction, and
 by a signal when the carrier 14 stops after a partial route.

In a further embodiment as shown in FIG. 6, for the transport plane 12 layout as shown in FIG. 2, the moving directions as arrows 601, 602, 603, 604 are defined on the transport plane by the control device 20 during initialization. Reference numbers are not given to each arrow and not all necessary arrows are shown. Only for the transport module 624 (enhanced with thicker line) all necessary arrows are present. For this transport module 624 each intersection of the arrows represents a logical position on the transport plane 12.

During initialization as shown FIG. 7 safe points 701 are defined on the transport plane 12. FIG. 7 shows three transport modules 24 with different pattern of safe points on the transport module 24. Each used transport module 24, which build up the transport plane 12 will have the same or a different pattern on safe points 701.

In an embodiment, the safe points 701 will coincide with the logical positions. The control device, hence the software module, calculates the partial routes of the carriers, so that the partial routes end at an safe point or a safe point can be reached within the next partial route. So for each partial route of a carrier one safe point is reserved on the transport plane. As shown in FIG. 7 for each pattern of safe points 701 exists free paths alongside the safe points 701 to move over the transport module.

In a further embodiment these safe points 701 are used for partial routes calculation which lay on the defined moving directions 601, 602 for this partial route.

In a further embodiment hand over positions are not used as safe points 701.

This allows avoiding dead locks, meaning that the carriers block each other from being able to move and no partial routes can be calculated anymore.

In a further embodiment, at least one logical position is present to allow free movement around the safe points.

In another embodiment each safe point has at least one neighboring logical position which is not a safe point and connected to neighboring logical positions defining a free path between the handover positions.

A handover position can be a position on the transport plane 12 on which a carrier 14 can be placed where either the object 16 is handed over to a station 18 or the carrier 14 can enter and/or exit the station 18.

In another embodiment of the distribution method the control device defines during initialization, a constant number of safe points for each transport module 24, 624.

FIG. 8 show a flow diagram how the control device hence/or the software module calculates the next partial route of a carrier 14. 1. The partial route of a carrier is determined by the Manhattan distance between its current position and its destination position to a next intermediate destination position using:
1. follow a straight line, if not possible
2. then follow an L shaped path, if not possible then
3. determine the next intermediate destination position using an A*-algorithm if not possible then
4 If carrier stays on current position less then n seconds then wait for change in neighborhood
if change happened restart with 1.
if carrier waited longer than n seconds then
5. search for the next safe point and use the A* algorithm to reach this safe point, and if not possible
4. wait for change in neighborhood and if change happened restart with 1.
wherein n is number between 1 and 10 in particular 3.

The neighborhood can be defined as an area with a radius of k logical positions around the carrier's 14 position or as the transport module 24, 624 on which the carrier 214 is currently placed. K is in the range of 2 to 50, in particular 6 to 40 more in particular 10 to 25. In particular each partial route is calculated to move over 24 logical positions or less.

In a further embodiment the control device 20 generates a waiting list for carriers waiting more than. In seconds with m equal or greater than 20 sec. In particular this list is generated for the entire transport layout. The waiting list is updated every time a carrier exceeds the waiting time m. The carrier 14 is than listed at the end of the list.

If a free path or a safe points becomes available again in the neighborhood, the carrier 14 in this neighborhood which is highest on the list will be moved next and a partial rule for this carrier 14 will be calculated as shown in FIG. 8.

Carriers 14 carrying an object 16 with high priority are set always on top of the list, or are placed on the list depending on the priority of the object 16.

In another embodiment of the method the logical fields next to a defective logical fields are emptied form any carrier placed on possible safe points 701. Possible safe points 701 are erased and carriers can not stop there anymore, but can still drive over these fields.

The invention claimed is:

1. A method of operating a distribution system, wherein the distribution system comprises:
a number of carriers wherein the carriers are adapted to carry one or more goods,
a transport plane, wherein the transport plane is adapted to support the carriers, wherein logical positions are defined on the transport plane,
a drive means, wherein the drive means are adapted to move the carriers on the transport plane,
and a control device adapted to control the drive means, wherein the method comprises the steps:
during an initialization of the distribution system the control device pre-defines from the logical positions a pattern of safe points on the transport plane, wherein safe points are logical positions selected in view of a range of motion for a carrier occupying said logical position such that on the safe points a carrier can be placed and can be moved away again, and
after the initialization of the distribution system the control device calculates partial routes for the carriers so that the end position of each partial route is either one of the safe points or has a free path to one of the safe points to be reachable in the next partial route, wherein, when ahead all safe points are occupied, the carrier cannot move because no safe point can be reached or can be reached in the next move.

2. The method of claim 1, wherein handover positions are defined on the transport plane to handover the goods, and wherein the safe points are pre-defined so that between the handover positions exists a free path alongside the safe points.

3. The method of claim 1, wherein the control device defines during the initialization of the distribution system moving directions as straight lines on the transport plane, wherein the calculated routes use these moving directions.

4. The method of claim 3, wherein during mapping of the distribution system inner corners are identified by identifying a change in direction of adjacent remaining vectors and calculating their vector product and mapping inner corners or outer corners to negative or positive vector products respectively depending on the initial direction of the vectors.

5. The method of claim 4, wherein during initialization neighboring inner corners are determined.

6. The method of claim 3, wherein the control device defines during the initialization of the distribution system moving directions as straight lines on the transport plane in at least two directions which are perpendicular to each other.

7. A method of operating a distribution system, wherein the distribution system comprises:
a number of carriers wherein the carriers are adapted to carry one or more goods,
a transport plane, wherein the transport plane is adapted to support the carriers, wherein logical positions are defined on the transport plane,
a drive means, wherein the drive means are adapted to move the carriers on the transport plane,
and a control device adapted to control the drive means, wherein the method comprises the steps:
during an initialization of the distribution system the control device pre-defines from the logical positions a pattern of safe points on the transport plane, wherein safe points are logical positions selected in view of a range of motion for a carrier occupying said logical position such that on the safe points a carrier can be placed and can be moved away again, and
after the initialization of the distribution system the control device calculates partial routes for the carriers so that the end position of each partial route is either one of the safe points or has a free path to one of the safe points to be reachable in the next partial route,
wherein, when ahead all safe points are occupied, the carrier cannot move because no safe point can be reached or can be reached in the next move,
wherein the routes of the carriers are calculated so that the carriers maintain a distance to an inner corner while passing the inner corner,
wherein a Manhattan distance between neighboring inner corners is determined,
wherein a node network is generated indicating the path and the Manhattan distance between at least two neighboring inner corners,
wherein the partial route of a carrier is determined by the Manhattan distance between its current position and its destination position to a next intermediate destination position using:
1. Follow a straight line, if not possible then
2. Follow an L shaped path, if not possible then 3. Determine the next intermediate destination position using an A*-algorithm if not possible then
4. If carrier stays on current position less then n seconds then wait for change in neighborhood
    4.1. If change happened restart with 1
5. If carrier waited longer than n seconds then
    5.1. search for the next safe point and use the A* algorithm to reach this safe point, and if not possible
    5.2. wait for change in neighborhood and if change happened restart with 1 wherein n is a number between 1 and 10.

8. The method of claim 1, wherein the transport plane consists of tile elements connected to each other, wherein during the initialization of the distribution system the control device maps a layout of the transport plane by identifying the boundaries by creating a vector for each edge of the tile elements, cancels out all vectors based on their neighbors of neighboring tile elements, and combines remaining vectors which are adjacent and have the same direction.

9. The method of claim 1, wherein the routes of the carriers are calculated so that the carriers maintain a distance to an inner corner while passing the inner corner.

10. The method of claim 9, wherein a Manhattan distance between neighboring inner corners is determined.

11. The method of claim 10, wherein a node network is generated indicating the path and the Manhattan distance between at least two neighboring inner corners.

12. The method of claim 11, wherein the node network is generated indicating the Manhattan distance between all neighboring inner corners.

13. The method of claim 1, wherein a position determination system determines the position of the carriers on the transport plane and sends position update messages to the control device, which trigger the release of reserved logical fields which were already passed by the carrier on its current movement.

14. The method of claim 1, wherein a carrier never moves longer than m logical positions wherein m is an integer between 3 and 50.

15. The method of claim 14, wherein m is an integer between 10 and 30.

16. The method of claim 14, wherein m is an integer 24.

17. The method of claim 7, wherein n is 3.

18. The method of claim 7, wherein the determined route is reserved for the carrier until the carrier reaches its intermediate or final destination.

19. The method of claim 18, wherein for each carrier the next intermediate destination position is determined one after the other until the final destination position is reached.

* * * * *